O. G. GRAHAM.
JOINTER.
APPLICATION FILED JULY 3, 1917.

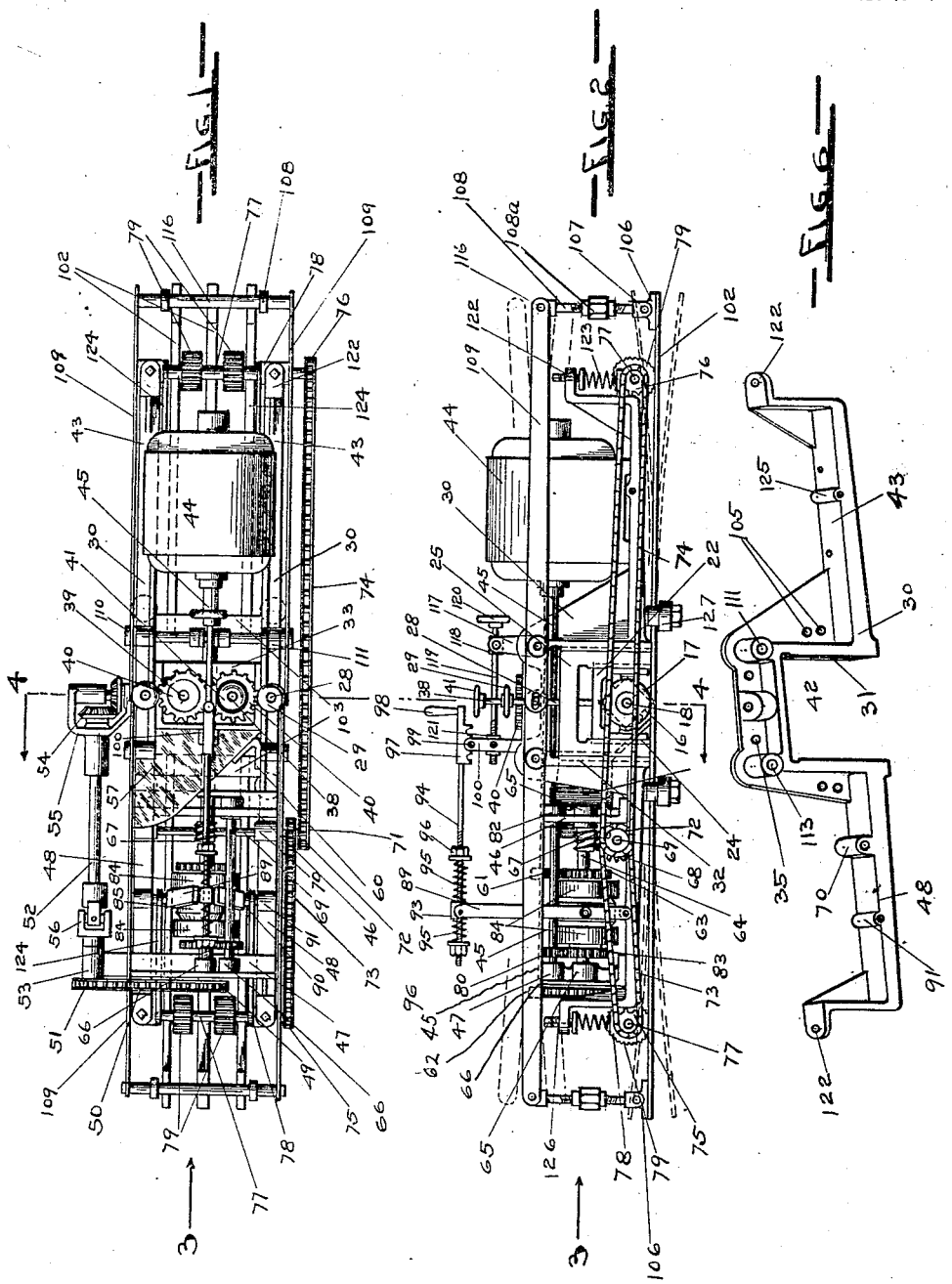

1,283,736.

Patented Nov. 5, 1918.
5 SHEETS—SHEET 2.

INVENTOR
OTIS G. GRAHAM
BY C. F. Blake
ATTY

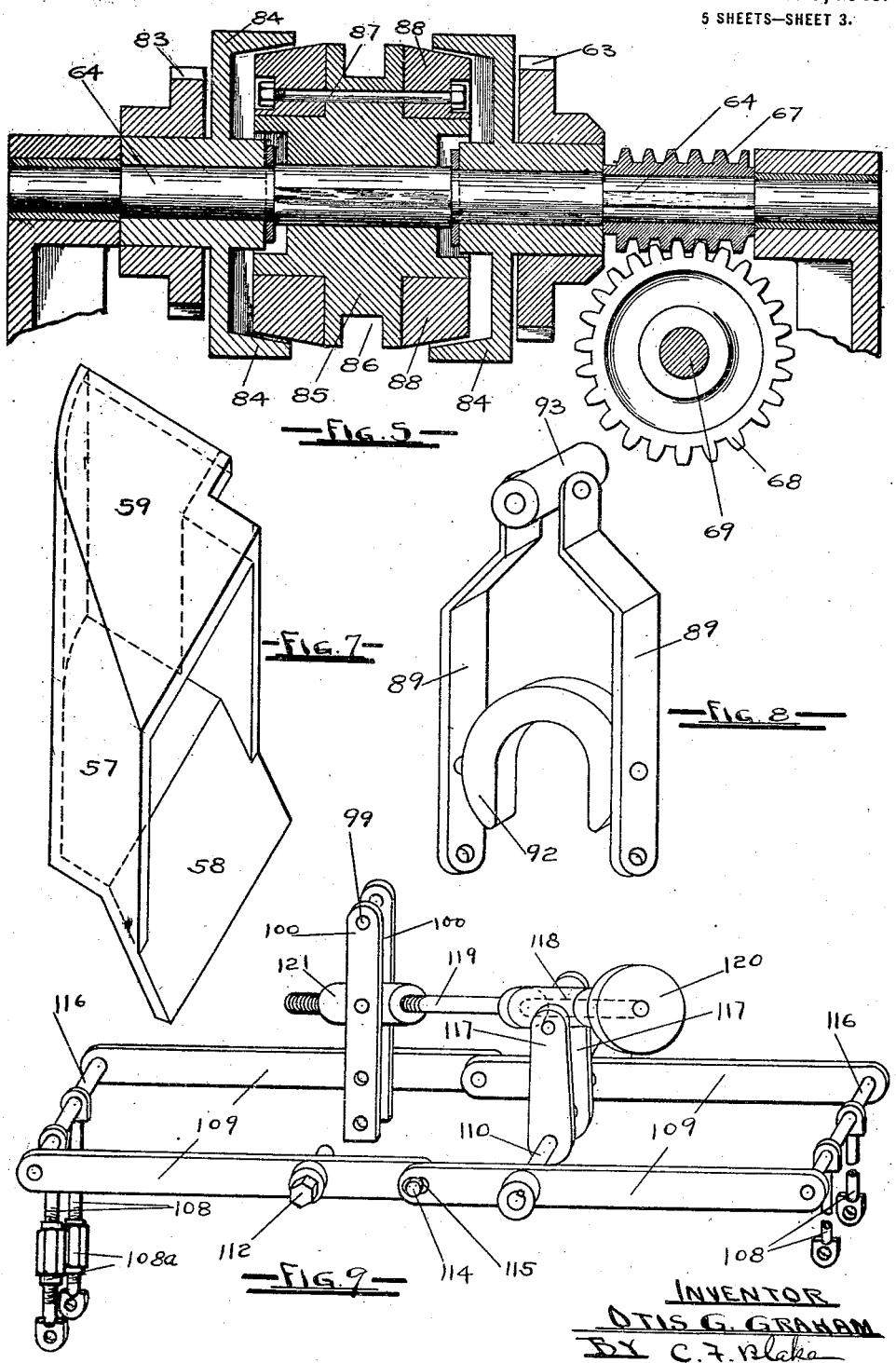

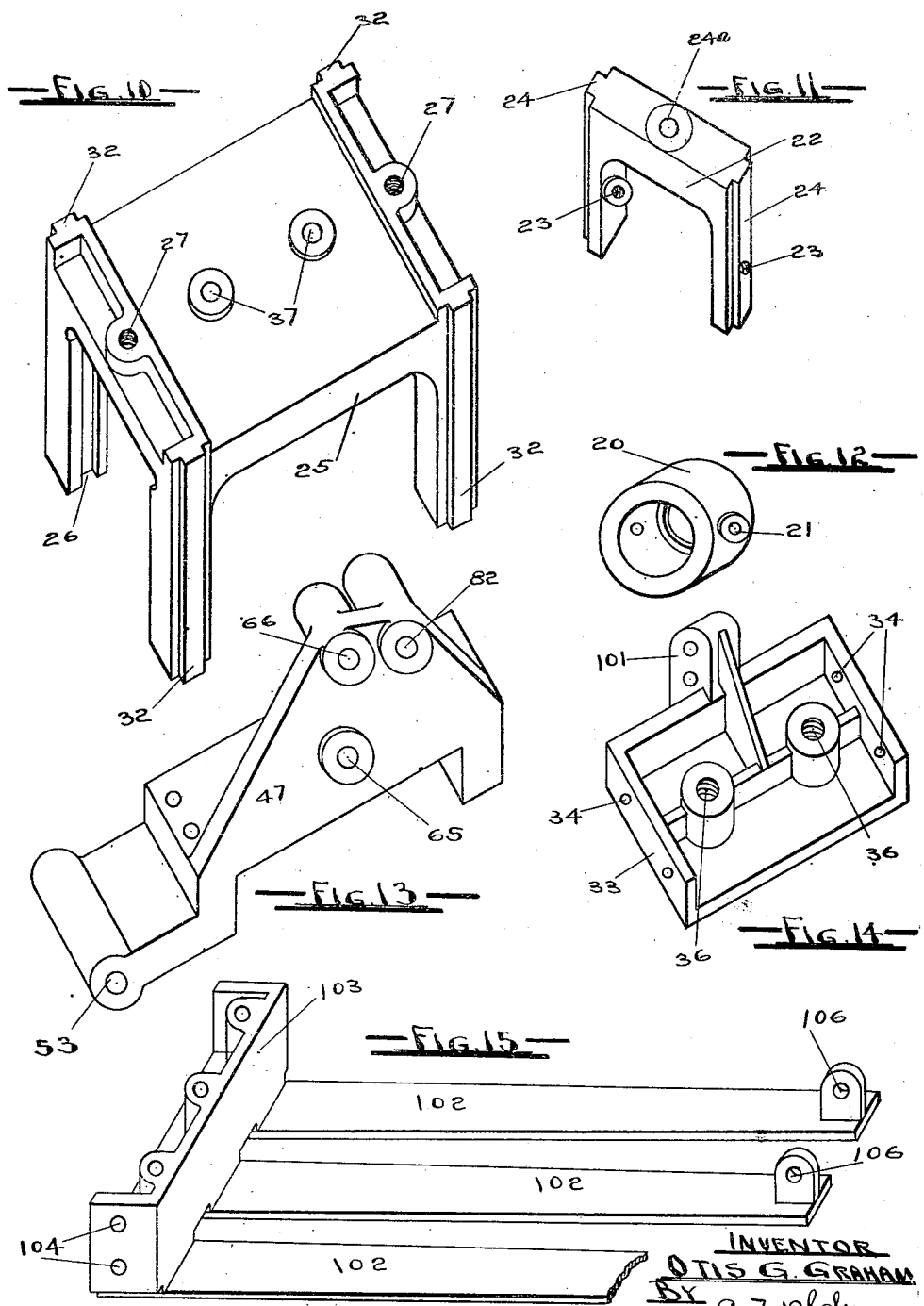

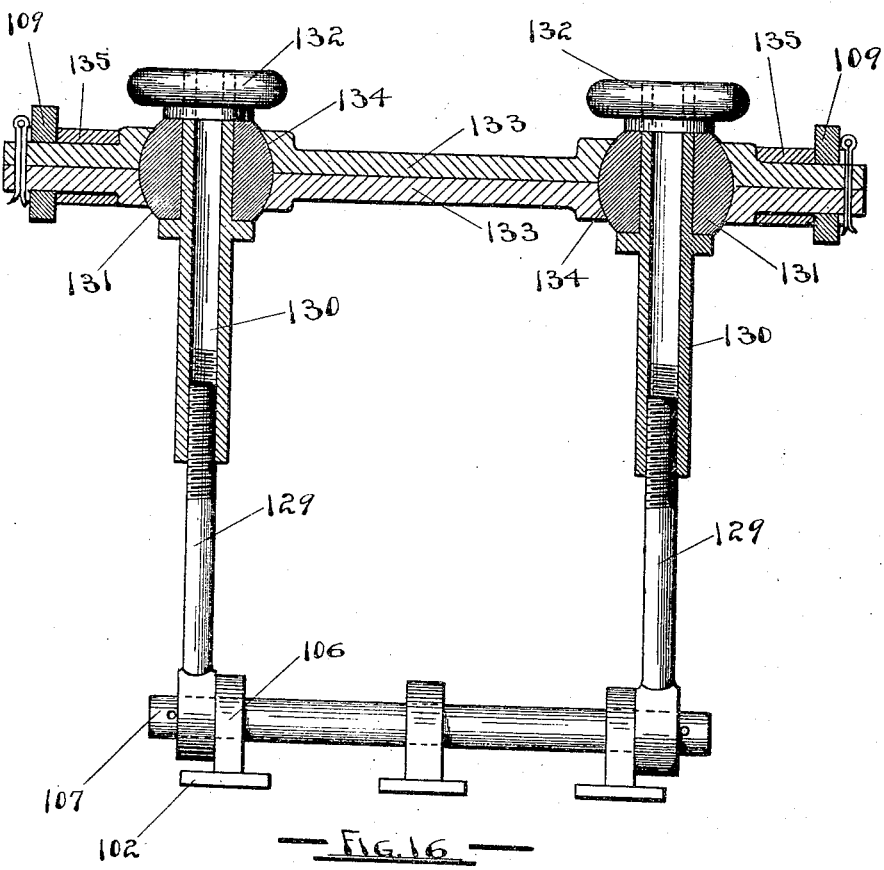

UNITED STATES PATENT OFFICE.

OTIS G. GRAHAM, OF PORTLAND, OREGON.

JOINTER.

1,283,736.　　　　Specification of Letters Patent.　　Patented Nov. 5, 1918.

Application filed July 3, 1917.　Serial No. 178,504.

*To all whom it may concern:*

Be it known that I, OTIS G. GRAHAM, a citizen of the United States, residing at Portland, county of Multnomah, State of Oregon, have invented certain new and useful Improvements in Jointers, of which the following is a specification.

My invention relates to jointers in general, and particularly to portable jointers, and is most especially adapted for use in dressing ship timbers.

The objects of my invention are to provide in a single simple, compact, easily handled, portable power machine means to cut a plane surface, means to cut any given bevel either right hand or left hand, means to cut either a concave or a convex surface, and means to change the character of the cut from either of the above mentioned to any other while the machine is in operation.

I accomplish the above objects, and other useful and desirable results that will appear and be set forth herein, by means of the construction illustrated in the accompanying drawings, like characters of reference indicating like parts throughout the several views, and in which:

Figure 1 is a plan view of my device.

Fig. 2 is a side elevation of my device.

Fig. 5 is an axial sectional elevation of the propelling reverse mechanism.

Figs. 6, 7, 8, 9, 10, 11, 12, 13, 14, and 15 are perspective views of various details to be hereinafter described, and Fig. 16 is a modification of the preferred means for adjusting the runners.

In general my invention is composed of a pair of parallel housings mounted upon flexible runners with suitable means for adjusting these runners to follow a convex, a plane, or a concave surface; a centrally disposed transverse frame mounted within said housings and means for adjusting said frame vertically for the purpose of regulating the depth of cut; a pair of side frames mounted within said transverse frame and means for independently adjusting said side frames vertically for the purpose of making a right hand or a left hand bevel cut; bearings oscillatingly mounted within said side frames; a cutter bar or head rotatably mounted within said bearings; reversible propelling mechanism for moving the device forward or backward upon the timber being cut or formed; a motor mounted upon the device; and means operable by said motor operating said propelling mechanism and said cutter head.

Figure 4:
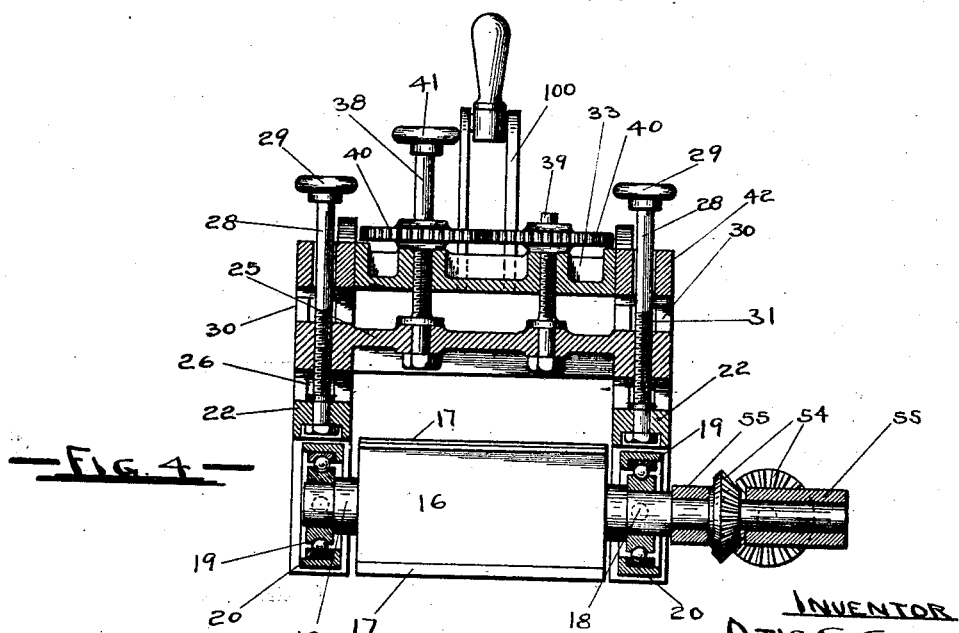
Fig. 4 is a transverse sectional elevation upon line 4—4 of Figs. 1 and 2.

The cutter head may be of any desired type, that illustrated at 16 in Figs. 2 and 4 being of the square type with knives 17 secured thereto, and is securely mounted upon a transverse shaft 18.

Said shaft 18 revolves in ball bearings 19 mounted in the oscillatable bearing 20, shown in detail in Fig. 12.

Said oscillatable bearing is provided with trunnions 21 which receive suitable bearing pins mounted within their respective side frames, about which pins the bearings 20 oscillate to accommodate the raising or lowering of either end of the cutter head shaft 18 for the purpose of setting the cutter to form a bevel.

Each oscillatable bearing 20 is mounted within one of the pair of side frames 22, shown in detail in Fig. 11, the trunnion pins being inserted in suitable bearings 23 in the side frames.

Each side frame 22 is provided with suitable vertical tongues 24 upon the sides thereof and a hole 24ª centrally disposed upon the top thereof.

Each of said side frames 22 is mounted to slide vertically within transverse frame 25, shown in detail in Fig. 10.

Said transverse frame 25 has vertical guide slots 26 adapted to receive the tongues 24 of the side frames 22.

Centrally located relative to the said guide slots 26 and above the same, so as to be alined with hole 24ª when side frame 22 is in place, is a threaded hole 27.

Each side frame has a rod 28 rotatably mounted and longitudinally fixed within the hole 24ª, said rods being threaded into their respective threaded holes 27 in transverse frames 25, as shown in Fig. 4.

By reference to Fig. 4 it is evident that by means of either one of the threaded rods 28 operated by the hand wheels 29 thereon the respective bearings 22 may be either raised or lowered for the purpose of raising or lowering one end of the cutter head 16 and thus causing it to cut a bevel upon the timber being formed.

Said transverse frame 25 is mounted to slide vertically within the housings 30, shown in detail in Fig. 6.

Housings 30 form the sides of the device, are parallel, and are connected by suitable cross beams to be respectively described hereinafter.

Each of said housings 30 is provided with vertical guide slots 31 within which suitable tongues 32 upon transverse frame 25 are adapted to slide.

Centrally located respectively to said housings 30 and above said transverse frame 25 is a cross beam 33, shown in detail in Fig. 14.

Said cross beam is provided with bolt holes 34 corresponding respectively to bolt holes 35 in housings 30 whereby said housings may each be connected rigidly to said cross beam by suitable bolts.

Located upon the transverse axis of cross beam 33 and somewhat separated one from the other are threaded holes 36, which threaded holes are respectively alined with holes 37 in transverse frame 25 when the same is in place within the housings 30, as shown in Fig. 4.

Rotatably mounted and longitudinally fixed within holes 37 of transverse frame 25 are rods 38 and 39, said rods being threaded, one right hand and the other left hand, into their respective threaded holes 36 in cross beam 33, as shown in Fig. 4.

Rods 38 and 39 are connected by spur gears 40, and rod 38 has thereon a hand wheel 41 whereby the two rods may be simultaneously operated.

The simultaneous operation of said rods 38 and 39, raises and lowers with parallel movement the transverse frame 25, thereby, through the agency of side frames 22 and bearings 20, raising or lowering the cutting head 16 with parallel motion for the purpose of regulating the depth of cut of the knives 17.

The mechanisms just described for raising and lowering the cutting head and for setting the cutting head on an angle for cutting bevels are best illustrated in their relative assembled positions in Fig. 4, it being here shown that rods 28 are freely mounted within holes 42 of housings 30.

Each of the housings 30 is provided with a rearwardly extending horizontal arm 43 upon which arm is mounted a suitable motor 44, the same being illustrated in Figs. 1 and 2 as an electric motor, although any other suitable motor may be employed if desired.

The motor shaft 45 extends forwardly longitudinally upon the axis of the machine intermediate the housings 30 and beneath the cross beam 33, and is mounted upon the forward end of the machine in bearing brackets 46 and 47, the latter being shown in detail in Fig. 13, which brackets are secured to forwardly extending arms 48 of housings 30.

Upon the extreme forward end of motor shaft 45 is secured a chain sprocket 49 which is connected by a suitable transmission chain 50 to a sprocket 51 upon shaft 52, which shaft is journaled in bearing 53 upon bracket 47.

Shaft 52 extends rearwardly and is connected to cutter head shaft 18 by means of bevel gears 54, a bearing yoke 55 surrounding said bevel gears and having bearings upon each of shafts 18 and 52, as illustrated in Fig. 1, whereby either of shafts 18 and 52 may rotate freely about the other shaft without interference with the driving function of bevel gears 54.

A universal joint 56 is introduced into shaft 52 for the purpose of accommodating the vertical movement of the cutter head shaft 18.

Figure 3:
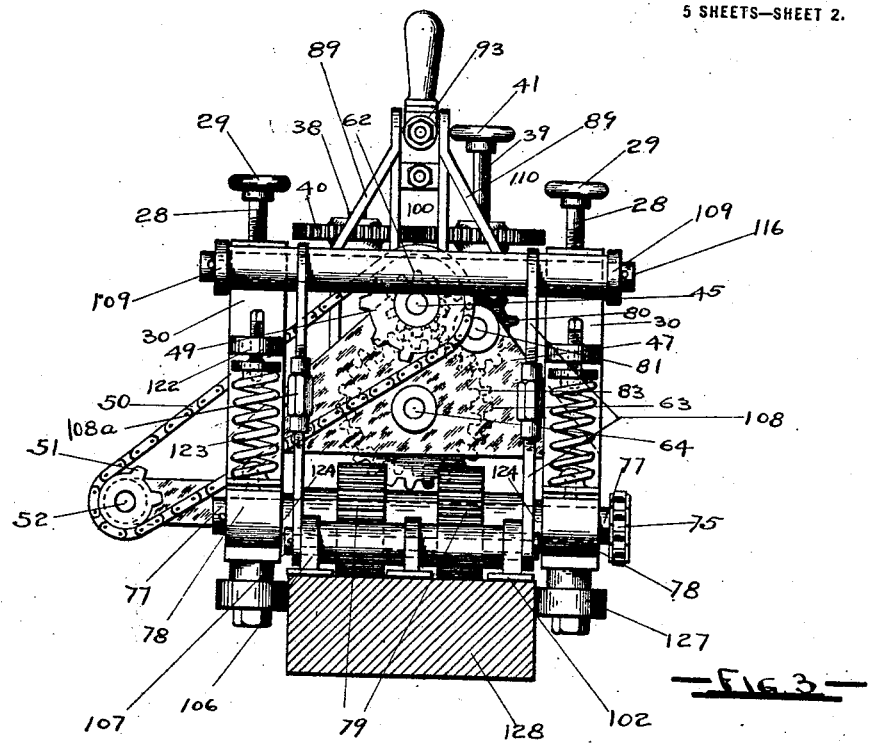
Fig. 3 is an end elevation in the direction of the arrows 3 in Figs. 1 and 2.

The cutter head driving mechanism just described is best illustrated in Figs. 1 and 3, where the several parts are shown in their relative assembled positions.

A dust box 57, shown in detail in Fig. 7, is provided for the purpose of catching the shavings as they are liberated by the cutter knives 17, and conducting said shavings away from the mechanism of the machine and discharging them to one side.

For this purpose said dust box is provided with a rearwardly and downwardly inclined apron 58 terminating immediately in front of the cutter head 16 and slightly above the level of the surface of the timber being formed, which apron guides the shavings into the box.

The box 57 is provided with a side opening 59 from which the shavings are discharged.

Said box is suitably secured between the housings 30 by a clip 60, as shown in Fig. 1.

Mounted upon motor shaft 45 are two pinions 61 and 62, the same being respectively the forward and rearward propelling pinions.

Pinion 61 meshes with a gear 63 which is connected by a clutch to worm shaft 64, which shaft is axially located intermediate housings 30 and below motor shaft 45, and is mounted in bearings 65 in brackets 46 and 47, the motor shaft 45 being journaled in bearings 66 in said brackets.

When the male clutch cone 85 is moved to engage that female clutch cone 84 upon which is mounted gear 63, it thus places gear 63 into engagement with shaft 64, which shaft is then rotated by gear 63 in a direction which propels the machine forwardly, said propulsion being performed by the mechanism previously described which connects shaft 64 with the propelling rollers 79.

When the male clutch cone 85 is moved to engage that female clutch cone 84 upon which is mounted the gear 83 it places said gear 83 into engagement with shaft 64, which shaft is then rotated by said gear 83 in a direction which propels the machine rearwardly, said propulsion being performed by the mechanism previously described which connects shaft 64 with the propelling rollers 79.

Gear 63 is rotated directly from pinion 61 upon shaft 45.

Gear 83 is rotated from pinion 62 upon shaft 45 by means of intermediate gear 80.

Therefore gears 63 and 83 rotate in opposite directions, due to the idle gear 80.

The direction of propulsion of the machine is determined by the direction of rotation of shaft 64, and the direction of rotation of said shaft 64 is determined by the employment of clutch cone 85 as previously explained, which in one case connects said shaft 64 to shaft 45 by means of gear 63 and pinion 61, and in the other case connects shaft 64 to shaft 45 by gear 83, idler gear 80 and pinion 62, the introduction of idler gear 83 causing the shaft 64 to have a rotation opposite to that which it has when driven by gear 63.

The female clutch cones 84 with their respective gears 63 and 83 are each loose upon shaft 64, so that when gear 63 is engaged with shaft 64 by means of male clutch cone 85, the gear 83 with its clutch cone 84 rotates freely upon shaft 64 and has no influence thereupon, and likewise when shaft 64 is being driven by gear 83 the gear 63 with its clutch cone 84 rotates freely upon shaft 64 and has no influence thereupon.

A worm 67 is secured to shaft 64, and meshes with a worm wheel 68 secured to a transverse shaft 69 journaled in bearings 70 upon the forwardly extending arms 48 of housings 30.

Upon one end of said transverse shaft 69 are secured sprockets 71 and 72, which are respectively connected by transmission chains 73 and 74 to forward and rearward propelling sprockets 75 and 76.

Each of said propelling sprockets 75 and 76 are secured to roller shafts 77, which are journaled in bearings 78 supported from housings 30.

Upon said roller shafts 77 are corrugated rollers 79 adapted to bear upon the surface of the timber being formed and thus to propel the machine along the timber.

To reverse the motion of the machine, pinion 62 upon motor shaft 45 meshes with an idler gear 80 upon shaft 81 supported in bearings 82 of brackets 46 and 47, and said idler gear 80 meshes with a gear 83, which latter gear is connected to worm shaft 64 by means of a clutch.

The clutch mechanism which connects gears 63 and 83 respectively to worm shaft 64 is illustrated in detail in Fig. 5.

Each of gears 63 and 83 are secured upon the hubs of female clutch cones 84 which face each other, and intermediate said clutch cones is a double male clutch cone.

Said male clutch cone is composed of a center 85 rotatably secured and longitudinally movable upon worm shaft 64, and provided with a peripheral slot 86.

Mounted upon center 85 and secured thereto by suitable bolts 87 are friction cones 88 of wood or other suitable material, said cones being adapted to coact with their respective female cones 84, as shown in Fig. 5.

Said female clutch cones 84 are secured against horizontal movement upon worm shaft 64 but are rotatably free thereon, and by engaging either of cones 84 with its respective cone 88 the worm shaft will be rotated by the respective gears 63 or 83.

Thus the direction of rotation of said worm shaft 64 is controlled by the above described clutch mechanism, and therefore the direction of motion of the machine is also so controlled.

The clutch member 85 is operated by a double lever yoke of two members 89 pivotally mounted intermediate the housings 30 upon a transverse shaft 90 journaled in bearings 91 upon the housings.

Intermediate said yoke members 89 and pivotally mounted thereon is a clutch collar 92 adapted to engage slot 86 in clutch member 85, and also intermediate said yoke members 89 and pivotally mounted thereon is a sleeve 93, as shown in detail in Fig. 8.

A longitudinally disposed rod 94 is freely mounted within sleeve 93, said rod having thereon coil springs 95, one at each end of sleeve 93, and adjusting nuts 96, as shown in Fig. 2.

Upon the rearward end of rod 94 is fixed a notched member 97 having a handle 98 thereon, the notches therein being adapted to engage a transverse pin 99 supported between vertical arms 100, which arms are secured to a forwardly projecting lug 101 upon cross-beam 33, as shown in Figs. 2 and 14.

The notches in member 97 are for the purpose of holding the clutch mechanism in forward, neutral, or rearward positions respectively, and the springs 95 compensate for the wear of the clutch members.

In operation, the machine, propelled by corrugated rollers 79, slides along upon the timber being formed by means of flexible runners 102.

e runners
ately adja-
ry and rearsupported ad-
a suitable cross-
cross beams is se-
intermediate the housings by bolts in
104 in the cross beams and 105 in the
housings.

The construction of said runners and their supporting cross beams is illustrated in detail in Fig. 15.

Upon the outer end of each of said runners 102 is secured a clip 106, through which clips respectively forward and rearward, are mounted pins 107, and upon these pins are pivotally mounted vertical links 108, as shown in Figs. 2 and 3.

By means of these links 108 the outer ends of said runners are depressed or raised, thus causing said runners to assume a convex or concave curvature respectively, for the purpose of planing such surfaces of timber when required, as shown in dotted lines in Fig. 2.

For the purpose of simultaneously operating said links and also securing them in any position desired, I provide duplicate pairs of levers 109 disposed upon opposite sides of the machine adjacent the housings, as shown in Figs. 1, 2 and 3, and in detail in Fig. 9.

The rearward members of each of said

The forward end of said rod 119 is threaded into a sleeve 121, which sleeve is pivotally mounted between arms 100.

The construction just described is illustrated in detail in Fig. 9.

In dressing a winding surface, such as ships timbers and the like, a raise in the surface is sometimes encountered, and if one of the forward runners 102 rides upon such a raise it lifts the cutters 17 away from the work.

To prevent this I insert into each of the links 108 a turn-buckle 108$^a$ by means of which the outer end of either of the outside forward or rearward runners 102 may be raised at will without materially disturbing the position of the remaining runners.

By this construction either of the outside runners may be independently lifted clear of any raised portion of the work, it being unnecessary to so adjust the central runner.

As a modification of the means above described for independently raising the ends of the outside runners 102 I may substitute for the links 108 threaded links 129 and sleeves 130 thereon, as shown in detail in Fig. 16.

Said sleeves, at the upper end thereof, are rotatably mounted and longitudinally fixed in substantially spherically shaped blocks 131, and hand wheels 132 are fixed upon the upper ends of said sleeves.

In place of cross pins 116 I substitute, in the modified form, axially split pins con- Adjusting screws 126 are threaded into lugs 122 upon housings 30, whereby the tension of springs 123 may be regulated.

Guide rollers 127 are secured to housings 30 and adapted to guide the machine along the timber 128, as shown in Figs. 2 and 3.

By means of the construction described and illustrated I am able to raise or lower the cutting knives to regulate the depth of cut; to raise or depress either end of the cutting knives independently of the other end for the purpose of cutting a bevel; to propel the machine forward or backward at will; to set the runners to follow either a convex, a plane or a concave surface; to raise or depress the outer end of any runner independently of the other runners; and to perform any combination of the above functions.

My invention may be made of any size and constructed of any material deemed convenient and suitable for a device of this character, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in the appended claims.

Having disclosed my invention so that others skilled in the art may be enabled to construct and to use the same, what I claim as new and desire to secure by Letters Patent is;

1. In a portable jointer, a pair of housings; cross beams connecting said housings; flexible runners, intermediate said housings and supported by certain of said cross beams; means to raise or lower the extreme ends of said runners simultaneously; means to raise or lower the extreme ends of certain of said runners independently; a cutter head transversely mounted intermediate said housings; means to raise or lower either end of said cutter head independently for the purpose either of cutting a bevel or of cutting a surface coincident with the lower surface of said runners; and means to operate said cutter head.

2. In a portable jointer, a pair of parallel housings; cross beams connecting said housings; a vertically slidable cross-frame transversely disposed intermediate said housings; a pair of vertically slidable side frames mounted within said cross frame, said side frames and said housings being in substantial alinement respectively; oscillatable bearings mounted in said side frames; a cutter head mounted in said bearings; means to operate said cross-frame; means to operate said side-frames; and means to operate said cutter head.

3. In a planing device, having a plurality of parallel flexible runners, means to raise or lower the extreme ends of a single runner independently of the other runners.

4. In a planing device, a plurality of parallel flexible runners; means to simultaneously adjust said runners to a convex or a concave surface; and means to raise or lower the extreme end of a single runner independently of the other runners.

5. In a portable jointer, a rotary cutter head; means to raise or lower said cutter head with a parallel motion; and means to raise or lower either end of said cutter head independently.

6. In a planing device; flexible runners; two pairs of parallel levers pivotally mounted upon the device and extending respectively forwardly and rearwardly; means to simultaneously and vertically adjust the extreme forward and rearward ends of said levers; and vertically adjustable means to connect the extreme ends of said levers with the adjacent ends of said runners.

7. In a planing device having flexible runners; corrugated propelling rollers adjacent said runners; and means independent of said runners whereby said rollers will automatically adjust themselves to preserve their relative position with said runners.

8. In a planing device; flexible runners; propelling rollers adjacent said runners; links pivotally mounted and intermediate said rollers and said device whereby said rollers propel said device upon said runners; and vertical springs intermediate said rollers and said device to allow said rollers to coincide with the plane of said flexible runners.

9. In a portable jointer, a plurality of flexible runners; means to adjust said runners to follow either a convex, a concave, a plane or a warped surface; a cutter; and means to adjust said cutter to cut the surface followed by said runners.

10. In a portable planing device; vertically adjustable flexible runners; propelling rollers adjacent said runners; means whereby said rollers may be automatically adjusted to roll upon a surface coincident with that of said runners; and means to operate said rollers.

In witness whereof I claim the foregoing to be my own I hereunto affix my signature, in the presence of a subscribing witness, at Portland, county of Multnomah, State of Oregon, this 23rd day of June, 1917.

OTIS G. GRAHAM.

Witness:
C. F. BLAKE.